UNITED STATES PATENT OFFICE.

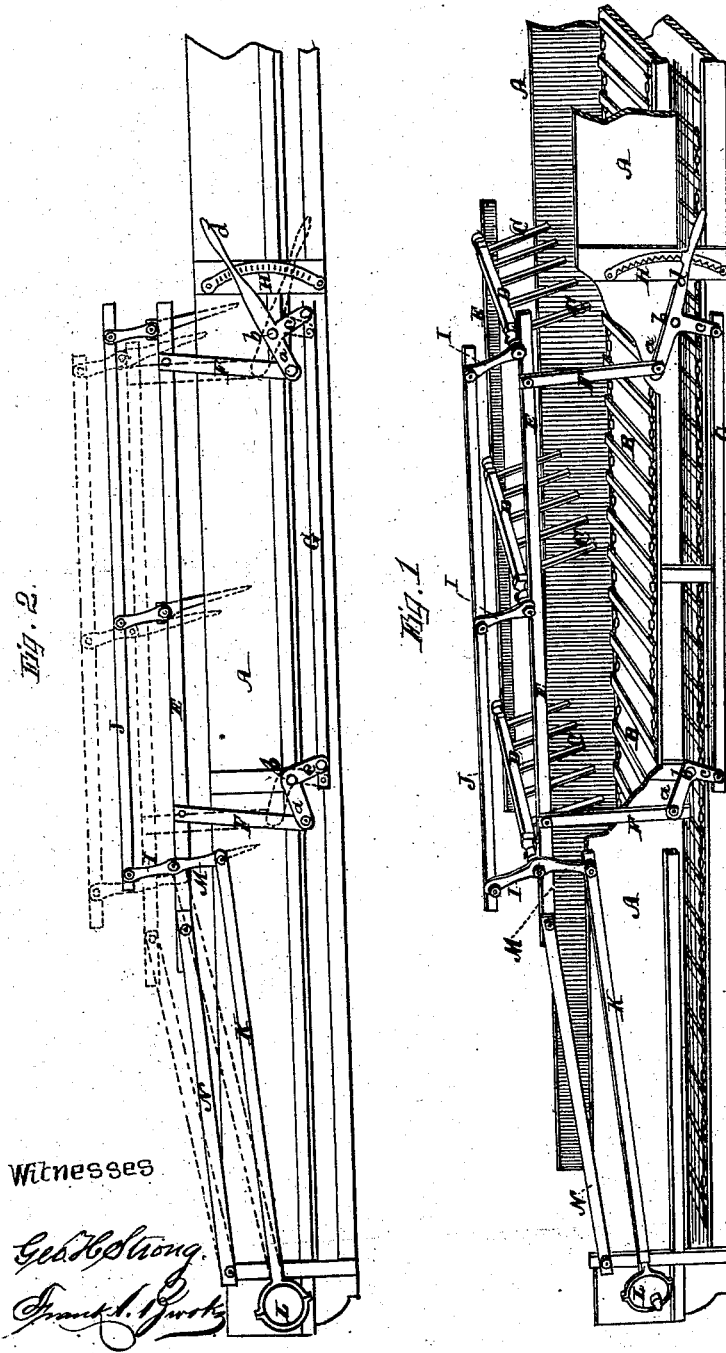

BYRON JACKSON, OF SAN FRANCISCO, CALIFORNIA.

SPREADING AND DISTRIBUTING DEVICE FOR THRASHING-MACHINES.

SPECIFICATION forming part of Letters Patent No. 239,253, dated March 22, 1881.

Application filed September 1, 1880. (No model.)

*To all whom it may concern:*

Be it known that I, BYRON JACKSON, of the city and county of San Francisco, and State of California, have invented an Improved Spreading and Distributing Device for Thrashing-Machine Elevators and Feeders; and I hereby declare the following to be a full, clear, and exact description thereof.

My invention relates to certain improvements in devices for spreading or distributing the grain and straw evenly upon the elevator or feeder of a thrashing-machine.

My improvements are based upon and applicable to an apparatus for the same purpose for which an application for a patent has been made by Thomas S. Bayley; and they consist, first, in a means for raising and lowering the rakes while at work; and, secondly, in a means for supporting the rakes and frame by brace-rods, forming, with the pitman, a parallel motion from a point near the driving-shaft to the side bars upon which the rakes are journaled, so that they may be elevated or depressed and the rakes maintain their relative position and angle without the necessity of making an adjustable connecting-rod or pitman to the driving-crank.

Referring to the accompanying drawings for a more complete explanation of my invention, Figure 1 is a perspective view of my apparatus with a portion of one side of the feeder broken away. Fig. 2 is a side elevation.

A is the feeder or elevator box or frame, through which the unthrashed straw is fed to the thrashing-cylinder. This is done in various ways—as by rollers, by forks, or pushing devices, or, as shown in the present case, by an endless carrying-belt, B, passing around rollers at each end of the frame, and driven by a belt from some portion of the machine.

The rakes consist of teeth C, secured in heads D, which extend across the machine above the belt, and are journaled so as to allow the rakes to be vibrated or oscillated above the belt in a manner similar to that shown in Bayley's device. In my invention the rake-heads are journaled upon longitudinal bars E, which are supported upon the vertical standards F. The lower ends of these standards are secured to the arms *a* of bell-crank levers, which have their angles *b* keyed to shafts extending through the frame, as shown. The other arms, *c*, of the levers are united by a connecting rod or bar, G, so that the two ends of the bars E may be elevated and depressed in unison. One of these bell-crank levers has a handle, *d*, extending out from it, and by operating this handle the rakes may be raised or depressed at any time.

A rack-bar, H, is secured to the side of the frame, and serves to hold the lever or handle at any desired point, and thus regulate the height of the teeth above the belt.

In order to balance the oscillations or vibrations of the rakes and prevent any undue movement consequent upon their movements, the crank-arms I are secured to the ends of the shafts or rake-heads so as to project upward and in an opposite direction to the teeth, and their weight, together with that of the bar J, which unites the ends of the cranks and causes them to move in unison, will counterbalance the weight of the rakes and that of the pitman K and its driving crank or eccentric L. The pitman connects with a crank, M, which extends downward in line with one of the crank-arms I, or forms an extension of it, as shown.

In order to support the standards F, and also to retain the rakes in their relative position to the carrier-belt and straw when they are elevated or depressed, I employ a brace-rod, N, which has one end pivoted to a point near the driving crank or eccentric and the other end to the longitudinal bar E, so as to stand above the pitman K, as shown. This arm N, connecting with the bar E, holds the standards F in their vertical position, and when they are elevated or depressed by the movement of the bell-crank levers the whole acts together as a sort of parallel motion, to keep the rakes in their proper relative position with reference to the carrier and the straw, whether they be high or low. By this means I am enabled to operate the device without any change in the length of the connecting-rod or pitman.

Having thus described my invention, what I claim as new, and desire to secure by Letters Patent, is—

1. The spreaders C D, journaled upon the bars E, and having the standards F, supported upon the bell-crank levers *a c*, said levers being united by connecting-rods and provided with the operating-handle *d* and rack H, substantially as herein described.

2. The spreaders C D, supported upon the side bars, E, and standards F, so as to be elevated or depressed and caused to oscillate by means of a crank or eccentric, as shown, in combination with the arm or bar N, united to the bar E, so as to support the spreaders and retain them in the proper position when they are elevated or depressed, substantially as herein described.

In witness whereof I have hereunto set my hand.

BYRON JACKSON.

Witnesses:
   T. S. KUYLEY,
   F. C. LUSK.